United States Patent
Byrnes, Jr. et al.

(10) Patent No.: US 10,626,915 B2
(45) Date of Patent: Apr. 21, 2020

(54) VERTICAL CONTROL ARM BUSHING WITH DUST BOOT HAVING STRENGTHENING PORTIONS

(71) Applicant: FEDERAL-MOGUL MOTORPARTS LLC, Southfield, MI (US)

(72) Inventors: Thomas J. Byrnes, Jr., St. Charles, MO (US); Steven D. Schmitt, Shobonier, IL (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 161 days.

(21) Appl. No.: 15/649,069

(22) Filed: Jul. 13, 2017

(65) Prior Publication Data
US 2019/0017541 A1   Jan. 17, 2019

(51) Int. Cl.
*F16C 11/06* (2006.01)
*B60G 7/00* (2006.01)
*F16C 11/04* (2006.01)

(52) U.S. Cl.
CPC .......... *F16C 11/0671* (2013.01); *B60G 7/005* (2013.01); *F16C 11/045* (2013.01); *F16C 11/069* (2013.01); *F16C 11/0614* (2013.01); *B60G 2204/416* (2013.01); *F16C 2326/05* (2013.01)

(58) Field of Classification Search
CPC ......... F16C 11/0671; Y10T 403/32631; Y10T 403/32729
See application file for complete search history.

(56) References Cited

U.S. PATENT DOCUMENTS

| 1,959,259 A | 5/1934 | Zerk |
| 2,304,732 A | 12/1942 | Flumerfelt |
| 3,279,832 A * | 10/1966 | Bergman ................. F16J 15/52 403/51 |
| 3,451,700 A | 6/1969 | Smith |
| 3,596,915 A | 8/1971 | Snidar |
| 4,043,564 A | 8/1977 | White |
| 5,046,745 A | 9/1991 | Sweetland et al. |
| 6,582,146 B2 | 6/2003 | Raymoure |
| 7,354,349 B2 | 4/2008 | Wette |
| 7,670,078 B2 | 3/2010 | Elterman et al. |
| 7,699,710 B2 | 4/2010 | Wette |
| 7,704,007 B2 | 4/2010 | Elterman et al. |

(Continued)

*Primary Examiner* — Michael P Ferguson
(74) *Attorney, Agent, or Firm* — Robert L. Stearns; Dickinson Wright, PLLC

(57) ABSTRACT

A vertical control arm bushing for allowing rotation of a control arm relative to a vehicle frame is provided and includes a housing extending along and annularly disposed about an axis and defining central bore extending axially therethrough. A stud has a pair of diametrically opposing end portions extending along the axis through the central bore of the housing. A pair of dust boots each includes a boot body defining an interior cavity and having a housing opening at a first longitudinal end attached to the housing and a stud opening at a second longitudinal end opposite the first longitudinal end sealingly engaging one of the end portions of the stud. The boot body defines a plurality of longitudinal strengthening portions formed therein for resisting rotation of the dust boot in response to a rotation of the stud and for improving sealing of the dust boot.

12 Claims, 12 Drawing Sheets

(56) References Cited

U.S. PATENT DOCUMENTS

| | | | |
|---|---|---|---|
| 7,762,123 B2 * | 7/2010 | Helasuo | F16J 15/52 285/227 |
| 7,992,876 B2 | 8/2011 | Aktuerk et al. | |
| 8,313,107 B2 | 11/2012 | Hoets et al. | |
| 8,393,624 B2 | 3/2013 | Hoets et al. | |
| 9,327,570 B2 * | 5/2016 | Karpman | F16C 11/0614 |
| 2015/0251512 A1 * | 9/2015 | Karpman | F16C 11/0614 403/122 |
| 2016/0025129 A1 | 1/2016 | Parker et al. | |

* cited by examiner

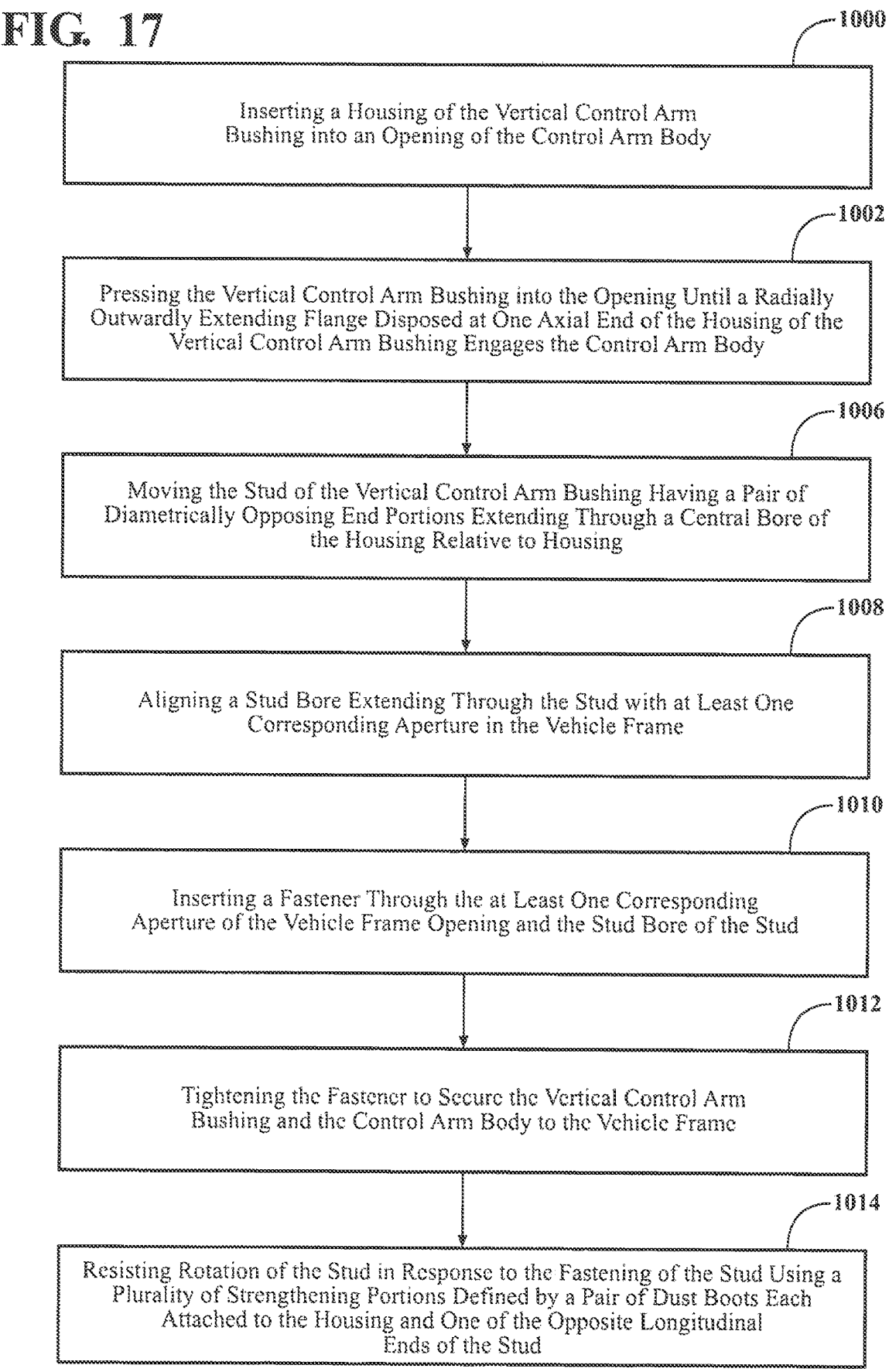

VERTICAL CONTROL ARM BUSHING WITH DUST BOOT HAVING STRENGTHENING PORTIONS

BACKGROUND OF THE INVENTION

1. Field of the Invention

The present invention is related generally to bushing assemblies and more particularly to vertical control arm bushing assemblies having a stud rotatably disposed in a housing with dust boot attached thereto for blocking contaminants and retaining lubricant in the housing while resisting twisting.

2. Related Art

Many automotive vehicles today employ suspension systems commonly known as MacPherson strut systems or double-wishbone systems. Such systems typically include a lower control arm (also referred to as an A-arm) which pivots relative to the vehicle's frame to allow a wheel and tire to move upwardly and downwardly relative to the frame during cornering or in response to encountering an object, such as a pot hole in the road.

A lower control arm assembly 10 for a Macpherson strut type of suspension system is generally shown in FIG. 1. The lower control arm assembly 10 includes a ball joint 11 for connection with a steering knuckle (not shown) of a hub assembly and a pair of bushings 12, 13 for guiding the pivoting movement of a control arm body 14 of the lower control arm assembly 10 relative to the vehicle frame 16. One of the bushings 12, 13 is a horizontal bushing 12 which is configured to pivot relative to the vehicle frame 16 about longitudinally extending bolt (not shown). The other bushing 13 is a vertical control arm bushing which is configured to pivot relative to the vehicle frame 16 about a vertically extending bolt (not shown).

Vertical control arm bushings, such as bushing 13, commonly include dust boots for blocking contaminants and retaining lubricant in a housing of the vertical control arm bushing. These dust boots are commonly made of rubber or other similar materials. The dust boot must maintain seals with both the housing and the stud through the full range of motion of the housing and stud relative to one another. In order to carry out its intended function, the dust boot must seal adequately. However, because of the flexible nature of the materials used to construct the dust boot, dust boots generally have difficulty providing a proper seal, especially where they engage the stud.

Additionally, because the vertically extending bolt extends through the stud, the dust boot can become vulnerable to damage in the event that it is twisted, for example, due to rotation of the stud while the vertically extending bolt is secured. Thus, there remains a need for improvements to such vertical control arm bushings to provide for improved sealing of the bushing, while also resisting rotation.

SUMMARY OF THE INVENTION AND ADVANTAGES

An aspect of the present disclosure provides for an improved vertical control arm bushing for allowing rotation of a control arm relative to a vehicle frame. The vertical control arm bushing includes a housing extending along and annularly disposed about an axis and defining central bore extending axially therethrough and an exterior surface adapted for receipt within an opening of the control arm. A stud has a pair of diametrically opposing end portions and extends along the axis through the central bore of the housing and moveable relative to the housing. A pair of dust boots each includes a boot body disposed annularly about the axis and defining an interior cavity. The boot body has a housing opening at a first longitudinal end attached to the housing and a stud opening at a second longitudinal end opposite said first longitudinal end sealingly engaging one of the end portions of the stud. The boot body defines a plurality of longitudinal strengthening portions formed therein for resisting rotation of the dust boot in response to a rotation of the stud and for improving sealing of the dust boot with the end portion of the stud.

In another aspect of the present disclosure, a method of installing a vertical control arm bushing in a vehicle is also provided. The method includes the step of inserting a housing of the vertical control arm bushing into an opening of the control arm. Next, fastening the stud to a frame of the vehicle. The method continues by resisting rotation of the stud in response to the fastening of the stud using a plurality of strengthening portions defined by a pair of dust boots each attached to the housing and one of opposite longitudinal ends of the stud.

The invention in its broadest aspect therefore affords a vertical control arm bushing that provides resistance to rotation with improved sealing where the dust boot engages the stud.

BRIEF DESCRIPTION OF THE DRAWINGS

These and other features and advantages of the present invention will be readily appreciated, as the same becomes better understood by reference to the following detailed description when considered in connection with the accompanying drawings wherein:

FIGS. 16 and 17 are flow charts that illustrate steps of a method of installing a vertical control arm bushing in a control arm body of a vehicle.

DESCRIPTION OF THE ENABLING EMBODIMENTS

One or more example embodiments of a vertical control arm bushing constructed in accordance with the present disclosure will now be more fully described. These example embodiments are generally directed to vertical control arm bushings including dust boot attached thereto for blocking contaminants and retaining lubricant while resisting twisting. To this end, numerous specific details are set forth as examples of specific components, devices and mechanisms associated with vertical control arm bushings to provide a thorough understanding of each of the embodiments associated with the present disclosure. However, as will be apparent to those skilled in the art, not all specific details described herein need to be employed, the example embodiments may be embodied in many different forms, and that neither should be construed nor interpreted to limit the scope of the disclosure.

Figure 1:
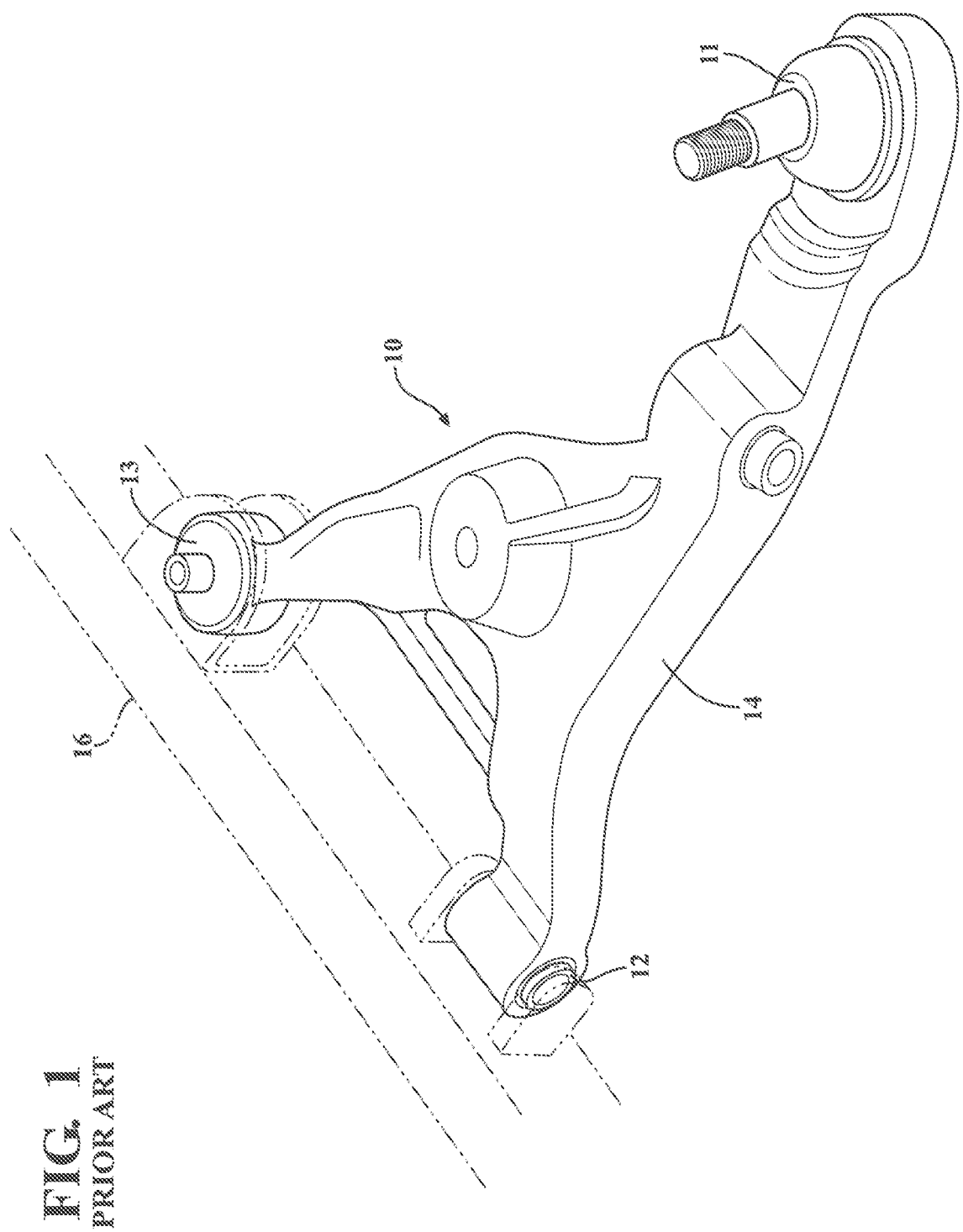
FIG. 1 is a perspective view of one known control arm assembly.

Referring to the Figures, wherein like numerals indicate corresponding parts throughout the several views, an improved vertical control arm bushing 20 and example embodiments of corresponding dust boots 22 are disclosed. FIG. 1 illustrates a prior art control arm assembly 10 for a vehicle suspension system includes a prior art vertical control arm bushing 13 configured to join a control arm body 14 with a vehicle frame 16. The prior art vertical control arm bushing 13 allows the control arm body 14 to pivot relative to the vehicle frame 16 during operation of the vehicle, for example, in response to a wheel on the vehicle encountering an obstacle such as a pothole or in response to the vehicle rolling while cornering at high speeds.

Figure 2:
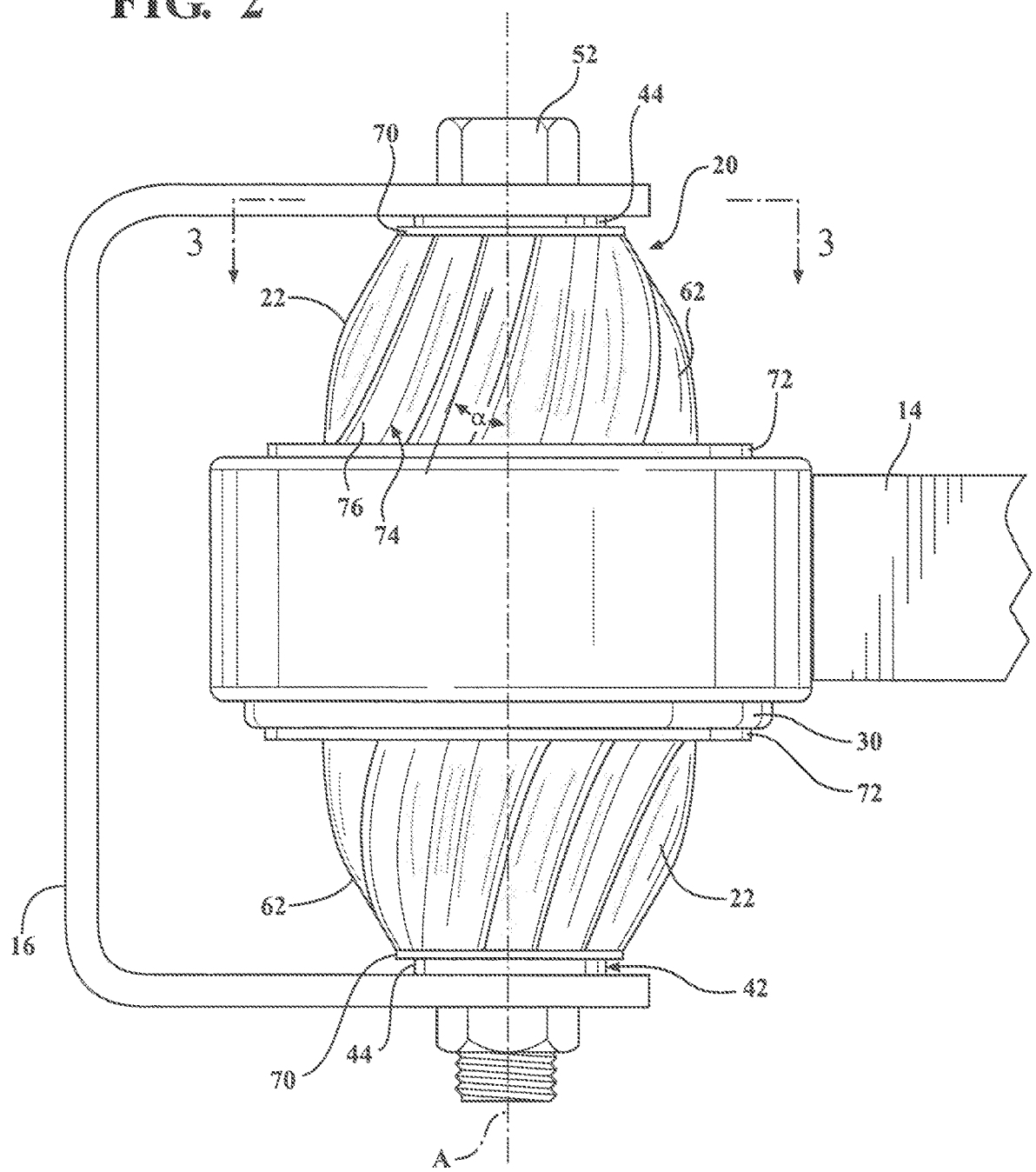
FIG. 2 is a side view of a vertical control arm bushing including a first exemplary embodiment of a dust boot.
Figure 3:
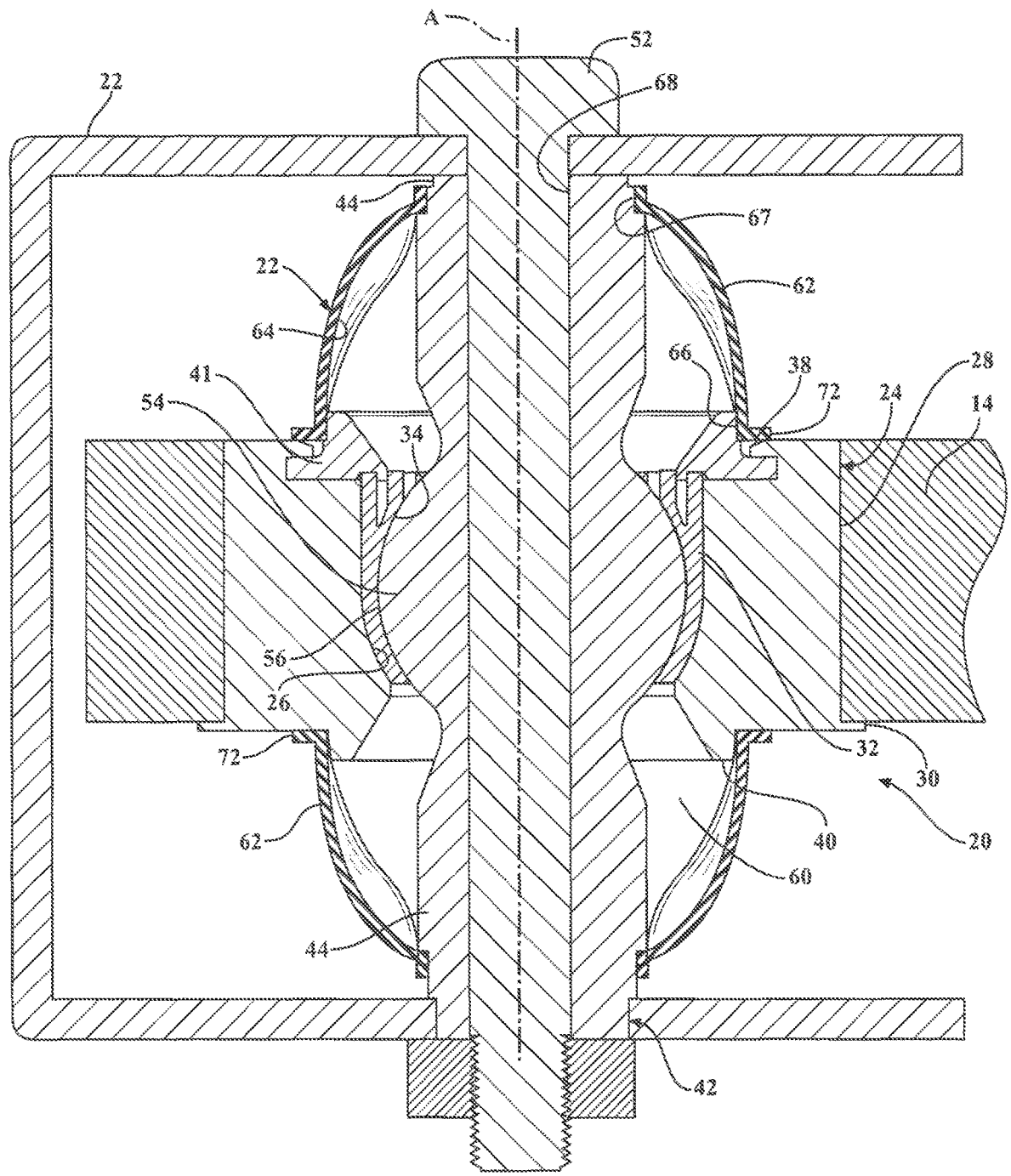
FIG. 3 is a cross-sectional view of the vertical control arm bushing of FIG. 2 taken along line 2-2.
Figure 4:
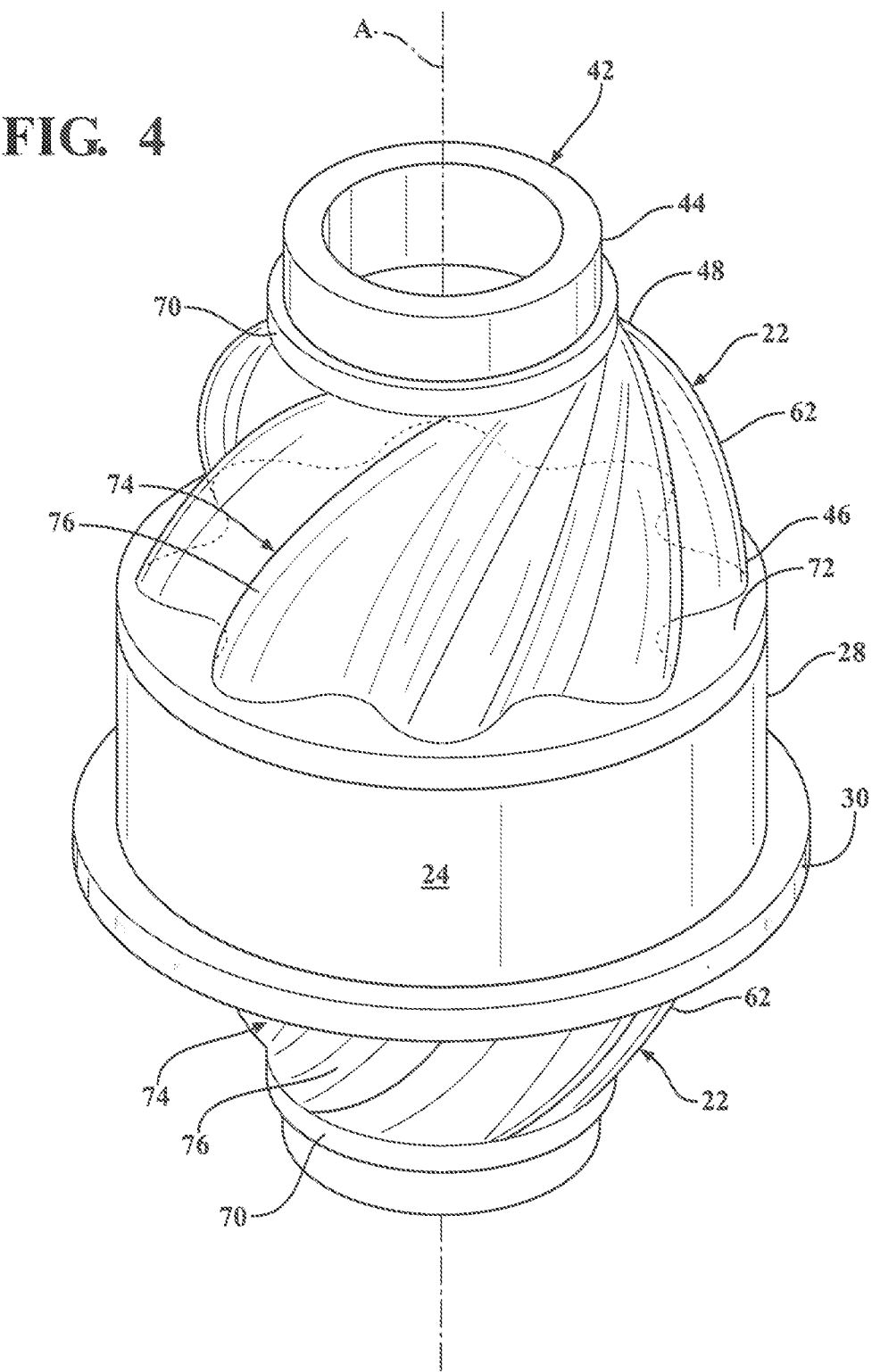
FIG. 4 is a perspective view of the vertical control arm bushing of FIG. 2.

As best shown in FIGS. 2-4, a first exemplary embodiment of the improved vertical control arm bushing 20 for allowing rotation of a control arm, such as control arm body 14, relative to the vehicle frame 16 shown in FIG. 1 is illustrated. The vertical control arm bushing 20 includes a housing 24 extending along and annularly disposed about an axis A and defines a central bore 26 extending axially therethrough. The housing 24 also defines an exterior surface 28 adapted for receipt within an opening of the control arm body 14. In detail, the exterior surface 28 of the housing 24 is shaped and sized to be press-fit into the opening of the control arm body 14. A radially outwardly extending flange 30 is disposed at one axial end of the housing 24 for aiding in the installation of the vertical control arm bushing 20 in the opening of the control arm body 14. During installation of the vertical control arm bushing 20 into the control arm body 14, the radially outwardly extending flange 30 defines a stopping point to ensure that the vertical control arm bushing 20 is properly installed in the opening of the control arm body 14. The housing 24 is preferably made of one integral piece of metal, such as steel, however, other materials may be utilized instead.

A bearing 32 is disposed in the central bore 26 of the housing 24 and defines a concave inner surface 34 surrounding a generally spherically-shaped cavity 36. In other words, concave inner surface 34 of the bearing 32 extends axially between opposite open first and second ends 38, 40. The concave inner surface 34 is curved with a generally constant diameter to present the generally spherically-shaped cavity 36. As such, the concave inner surface 34 is generally semi-spherically shaped or curved. The bearing 32 is held in place with a cover plate 41 disposed adjacent the first open end 38 of the housing 24. While the bearing 32 and the housing 24 are illustrated as separate elements, which are formed separately and are subsequently joined together, it should be appreciated that the bearing 32 and the housing 24 can be formed as one integral unit (e.g., integral piece of metal).

A stud 42 that has a pair of diametrically opposing end portions 44 extends along the axis A through the central bore 26 of the housing 24 and is moveable relative to the housing 24. The stud 42 is formed of one integral piece of material and extends through the bearing 32 past the opposite open ends 38, 40. The stud 42 has a stud bore 68 for receiving a fastener 52 to attach the stud 42 with the vehicle frame 16. The includes a ball portion 54 disposed between the end portions 44 that engages the spherically-shaped cavity 36 of said bearing 32 to establish slidable contact between the ball portion 54 of the stud 42 and the concave inner surface 34 of the bearing 32 to allow pivoting and rotation of the stud 42 relative to the bearing 32.

The ball portion 54 of the stud 42 can have a pair of curved surfaces 56 and a pair of recessed surfaces (shown in FIG. 12), however, it should be appreciated that the ball portion 54 may instead omit the recessed surfaces, for example. The curved surfaces 56 are generally semi-spherical in shape in that they have a generally constant diameter which is similar to the diameter of the spherically-shaped cavity 36 of the bearing 32 and the recessed surfaces are recessed relative to the diameter of the curved surfaces 56. That is, the curved surfaces 56 extend radially further from a central point in the ball portion 54 than the recessed surfaces. The curved surfaces 56 are diametrically opposite of one another, and the recessed surfaces are diametrically opposite of one another. The recessed surfaces of the ball portion 54 are generally flat in shape. However, it should be appreciated that the recessed surfaces could take a range of different shapes.

The diameter of the curved surfaces 56 of the ball portion 54 of the stud 42 is similar to the diameter of the spherically-shaped cavity 36 of the bearing 32, thus allowing for sliding contact between the curved surfaces 56 of the stud 42 and the concave inner surface 34 of the bearing 32. As shown, the ball portion 54 of the stud 42 is captured by concave inner surface 34 on both sides of an equator of the ball portion 54. That is, the single bearing 32 with the concave inner surface 34 supports both an upper hemisphere and a lower hemisphere of the ball portion 54. This enables the relative pivoting or rotation of the housing 24 relative to the stud 42. A lubricant 60, such as grease, is preferably employed to provide a low friction interface between the curved surfaces 56 of the stud 42 and the bearing 32 surface of the bearing 32.

A pair of dust boots 22 establish fluid-tight seals between the housing 24 and the stud 42 to hold the lubricant 60 within the vertical control arm bushing 20 and also to protect the internal components of the vertical control arm bushing 20 from external debris. Each dust boot 22 includes a boot body 62 disposed annularly about the axis A and defines an interior cavity 64. The boot body 62 has a housing opening 66 at a first longitudinal end 46 that attaches to the housing 24 and a stud opening 67 at a second longitudinal end 48 opposite the first longitudinal end 46 that sealingly engages one of the end portions 44 of the stud 42. The dust boot 22 can also include an upper boot wall 70 extending axially away from the boot body 62 at the second longitudinal end 48 and disposed coaxially with the stud opening 67. The dust boot 22 may additionally include a boot flange 72 extending radially outwardly from the boot body 62 at the first longitudinal end 46 and annularly about the housing opening 66. It should be appreciated that the dust boots 22 may be engaged with the stud 42 and the housing 24 through any other suitable connection means.

The boot body 62 defines a plurality of longitudinal strengthening portions 74 formed therein for resisting rotation of the dust boot 22 in response to a rotation of the stud 42 and for improving sealing of the dust boot 22 with the end portion 44 of the stud 42. The plurality of longitudinal strengthening portions 74 extend longitudinally at an acute angle α (e.g., 45 degrees) relative to the axis A in a relaxed condition of the dust boot 22 (i.e., when the dust boot 22 is not twisted or deformed in any way from its initially formed state). As illustrated, the plurality of longitudinal strengthening portions 74 include a plurality of waves 76.

Figure 5:
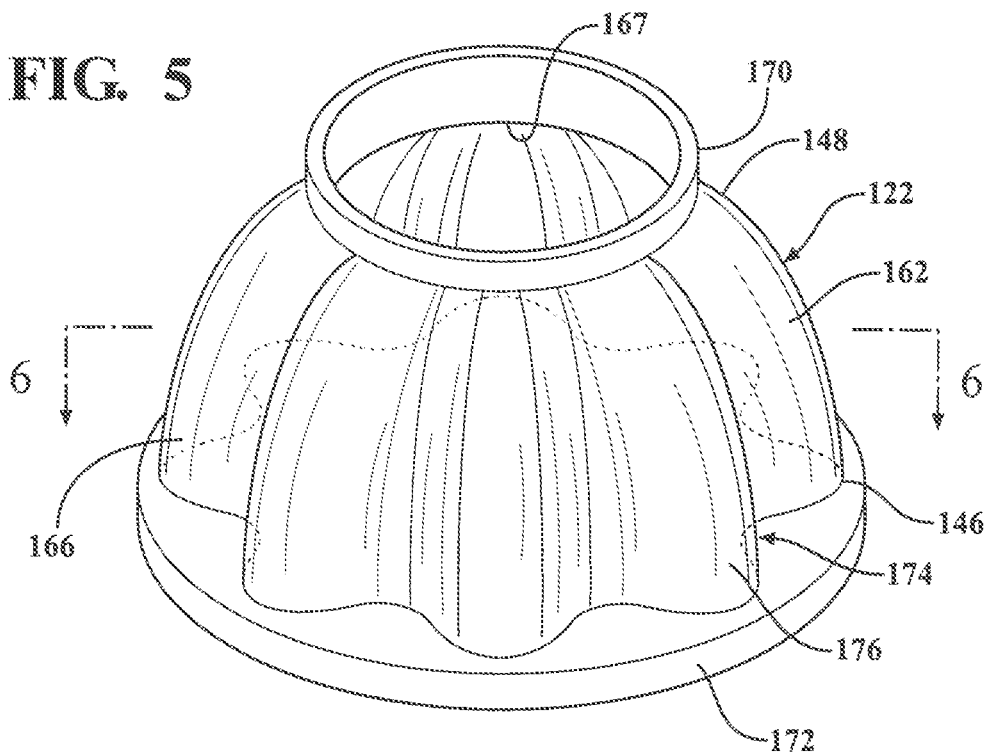
FIG. 5 is a perspective view of a second exemplary embodiment of a dust boot for a vertical control arm bushing.
Figure 6:
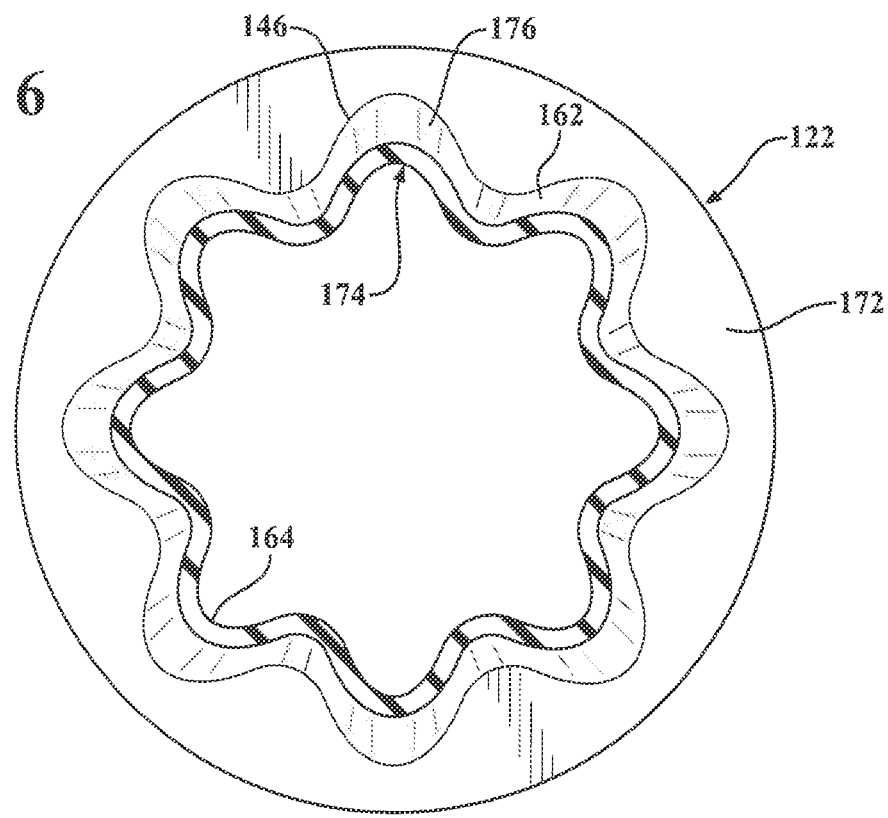
FIG. 6 is a cross-sectional view of the dust boot of FIG. 5 taken along line 6-6.

A second exemplary embodiment of a dust boot 122 o for a vertical control arm bushing is shown in FIGS. 5 and 6, with like numerals, separated by a prefix of "1", being used to show features corresponding to the first exemplary embodiment discussed above. In the second exemplary embodiment, the plurality of waves 176 extend longitudinally along the axis A from the first longitudinal end 146 of the boot body 162 to the second longitudinal end 148 of the boot body 162 (i.e., not at an acute angle α relative to the axis A in a relaxed condition of the dust boot 122). As with the first embodiment, the dust boot 122 of the second embodiment includes the upper boot wall 170 extending axially away from the boot body 162 at the first longitudinal end 146 and disposed coaxially with the stud opening 167. The boot flange 172 also extends radially outwardly from the boot body 162 at the second longitudinal end 148 and annularly about the housing opening 166.

Figure 7:
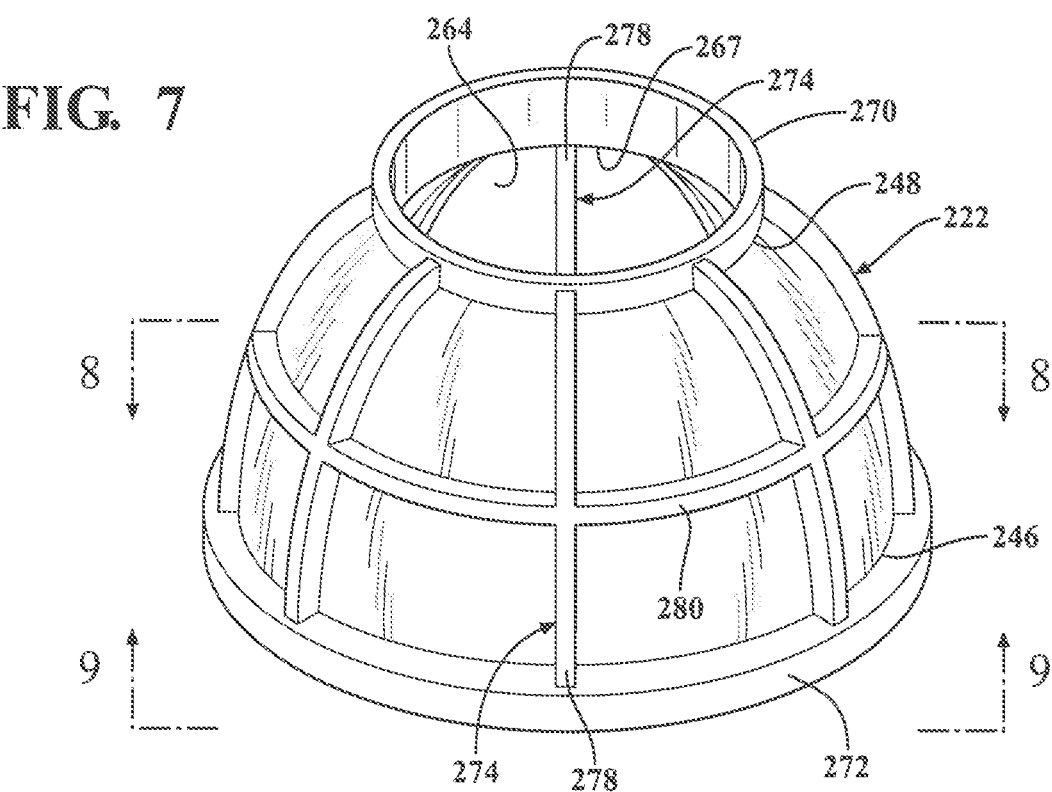
FIG. 7 is a perspective view of a third exemplary embodiment of a dust boot for a vertical control arm bushing.
Figure 8:
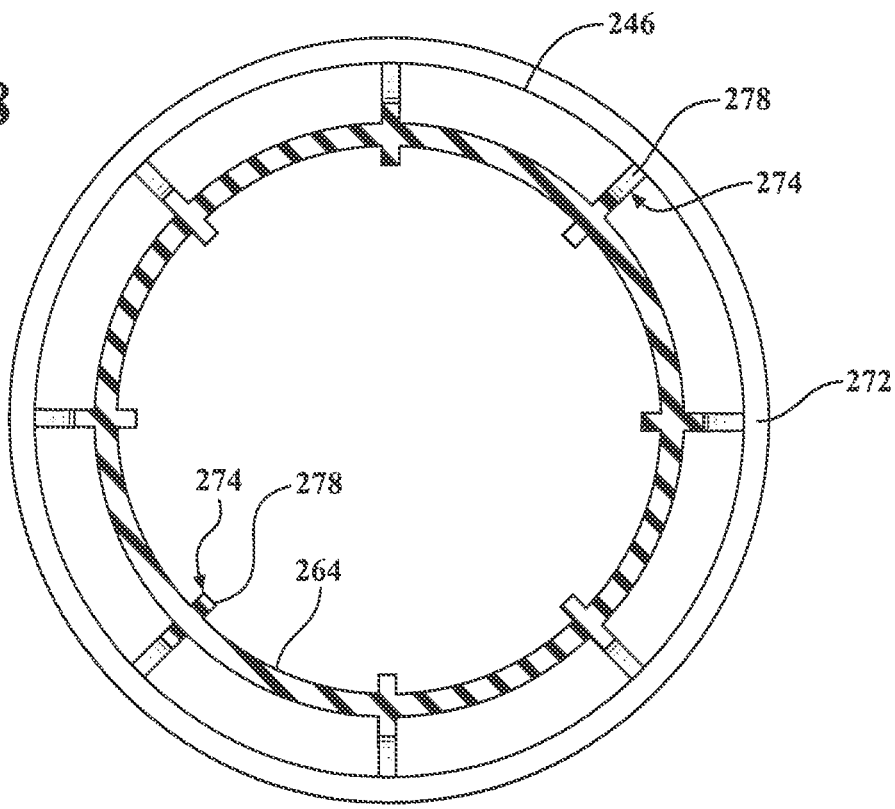
FIG. 8 is a cross-sectional view of the dust boot of FIG. 7 taken along line 8-8.
Figure 9:
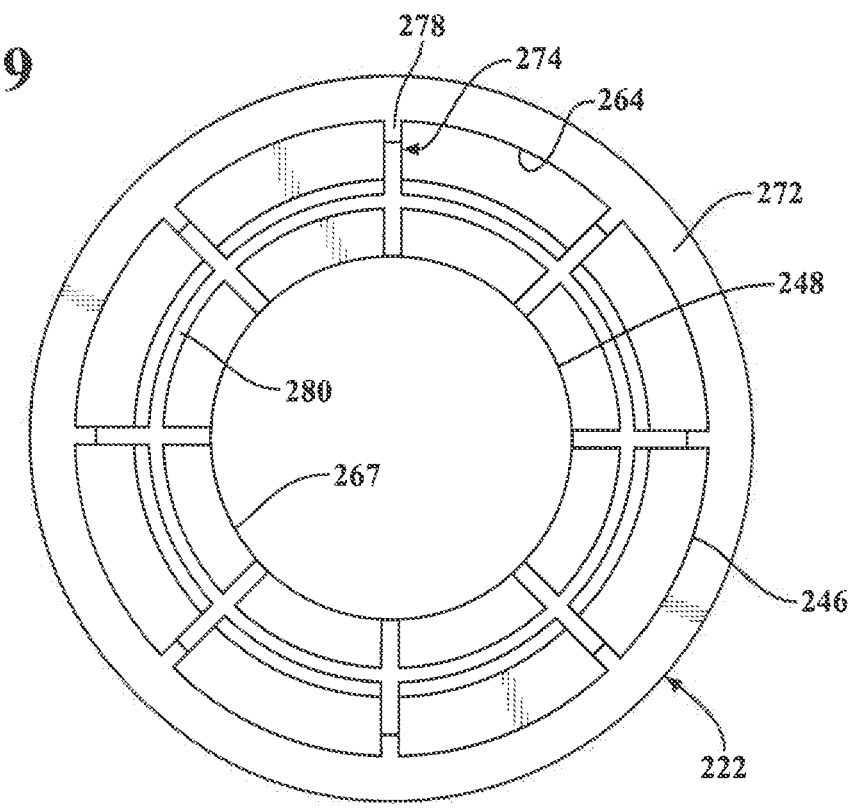
FIG. 9 is a bottom view of the dust boot of FIG. 7 taken along line 9-9.

A third exemplary embodiment of a dust boot 222 for a vertical control arm bushing is shown in FIGS. 7-9, with like numerals, separated by a prefix of "2", being used to show features corresponding to the first exemplary embodiment discussed above. In the third exemplary embodiment, the plurality of longitudinal strengthening portions 274 include a plurality of gussets 278 extending radially outwardly from the boot body 262. The boot body 262 also includes at least one transverse strengthening portion 280 disposed between the first longitudinal end 246 and the second longitudinal end 248 and extending circumferentially around and extending radially outwardly from the boot body 262. The plurality of longitudinal strengthening portions 274 also include a plurality of gussets 278 extending radially inwardly from the boot body 262 (i.e., into the interior cavity 264). The boot body 262 also includes at least one transverse strengthening portion 280 extending circumferentially around the boot body 262 and disposed between said first longitudinal end 246 and said second longitudinal end 248 and extending radially inwardly from said boot body 262.

Figure 10:
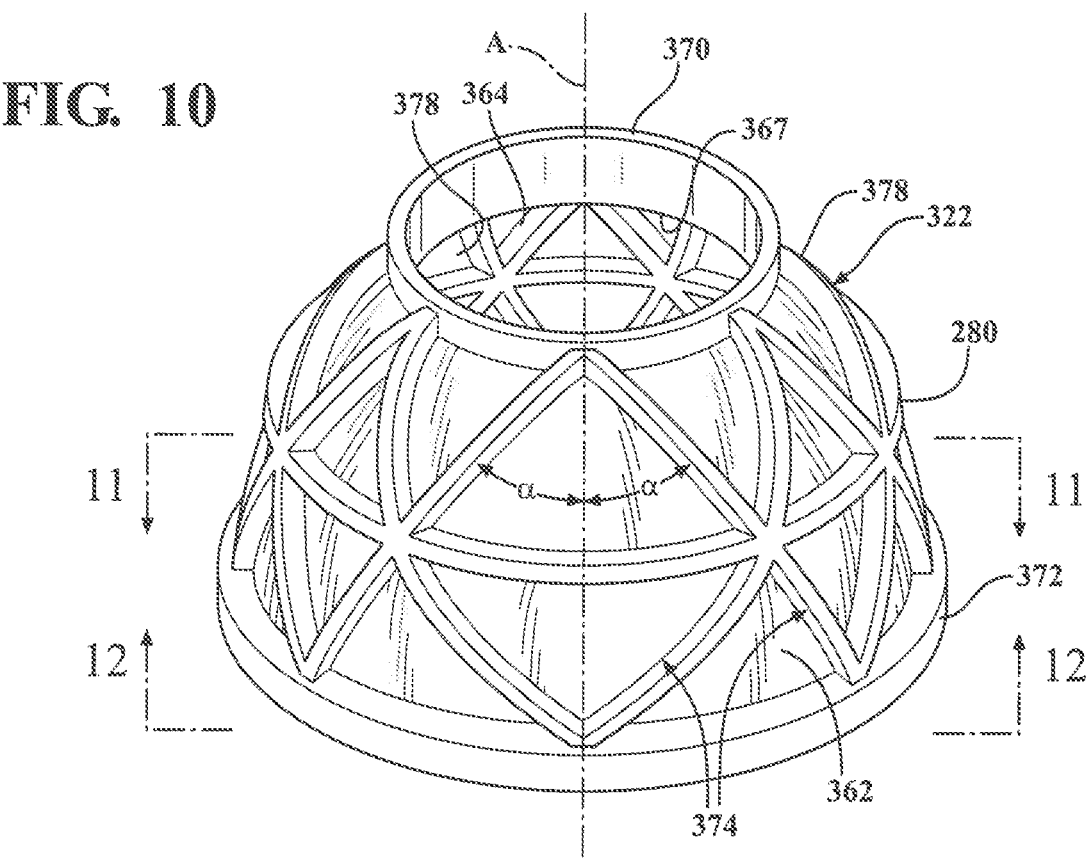
FIG. 10 is a perspective view of a fourth exemplary embodiment of a dust boot for a vertical control arm bushing.
Figure 11:
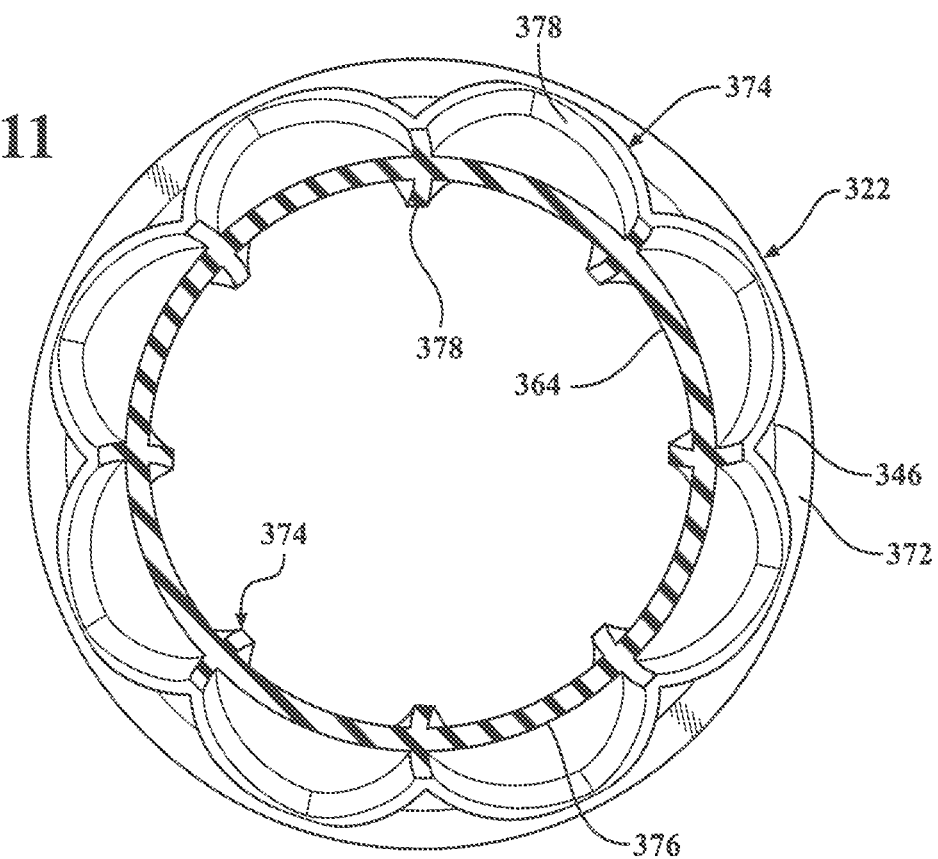
FIG. 11 is a cross-sectional view of the dust boot of FIG. 10 taken along line 11-11.
Figure 12:
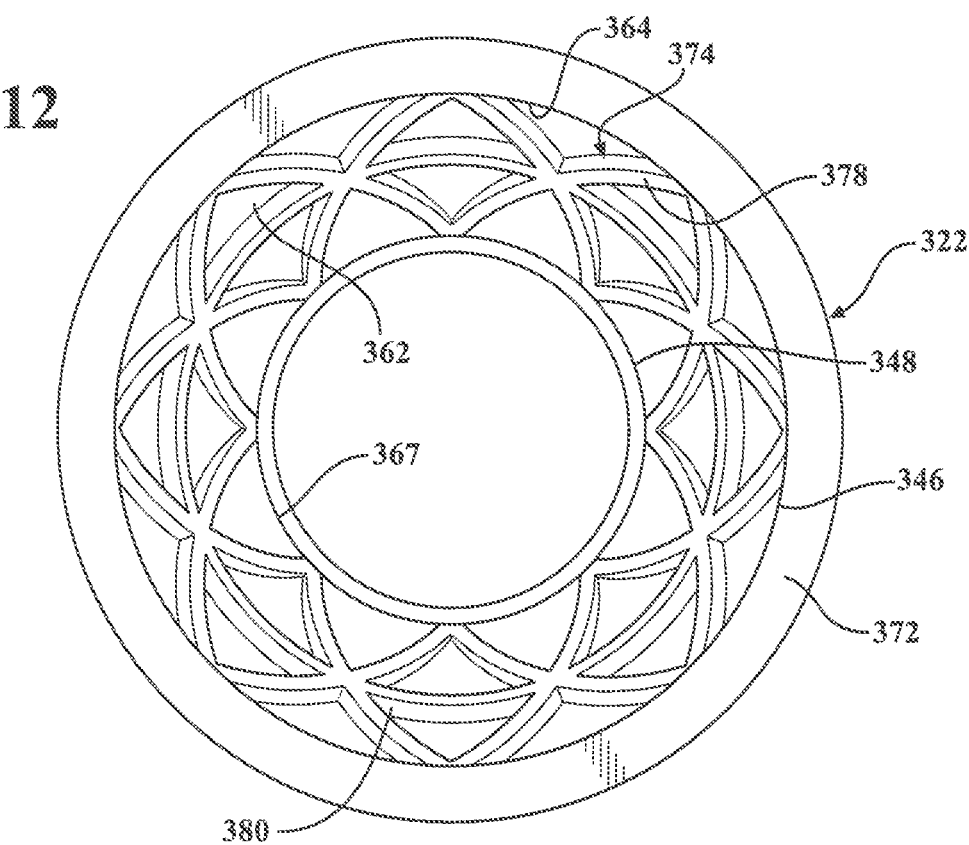
FIG. 12 is a bottom view of the dust boot of FIG. 10 taken along line 12-12.

A fourth exemplary embodiment of a dust boot 322 for a vertical control arm bushing is shown in FIGS. 10-12, with like numerals, separated by a prefix of "3", being used to show features corresponding to the first exemplary embodiment discussed above. In the fourth exemplary embodiment, the plurality of longitudinal strengthening portions 374 include a plurality of gussets 378 extending radially outwardly from the boot body 362. The plurality of gussets 378 include a plurality extending longitudinally at an acute angle α (e.g., 45 degrees) clockwise relative to the axis A in a relaxed condition of the dust boot 322 and a plurality extending longitudinally at an acute angle α (e.g., 45 degrees) counterclockwise relative to the axis A. The boot body 362 also includes at least one transverse strengthening portion 380 disposed between the first longitudinal end 346 and the second longitudinal end 348 and extending circumferentially around and extending radially outwardly from the boot body 362. The plurality of longitudinal strengthening portions 374 also include a plurality of gussets 378 extending radially inwardly from the boot body 362 (i.e., into the interior cavity 364) in both the clockwise and counterclockwise directions. The boot body 362 also includes at least one transverse strengthening portion 380 extending circumferentially around the boot body 362 and disposed between said first longitudinal end 346 and said second longitudinal end 348 and extending radially inwardly from said boot body 362.

Figure 13:
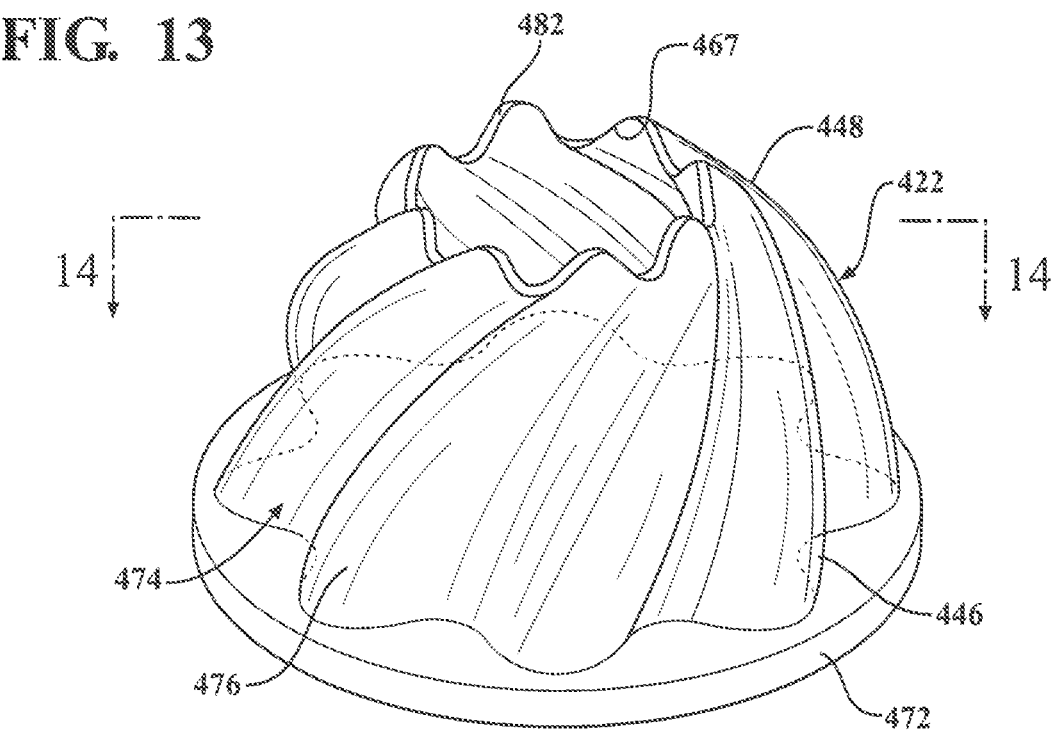
FIG. 13 is a perspective view of a fifth exemplary embodiment of a dust boot for a vertical control arm bushing.
Figure 14:
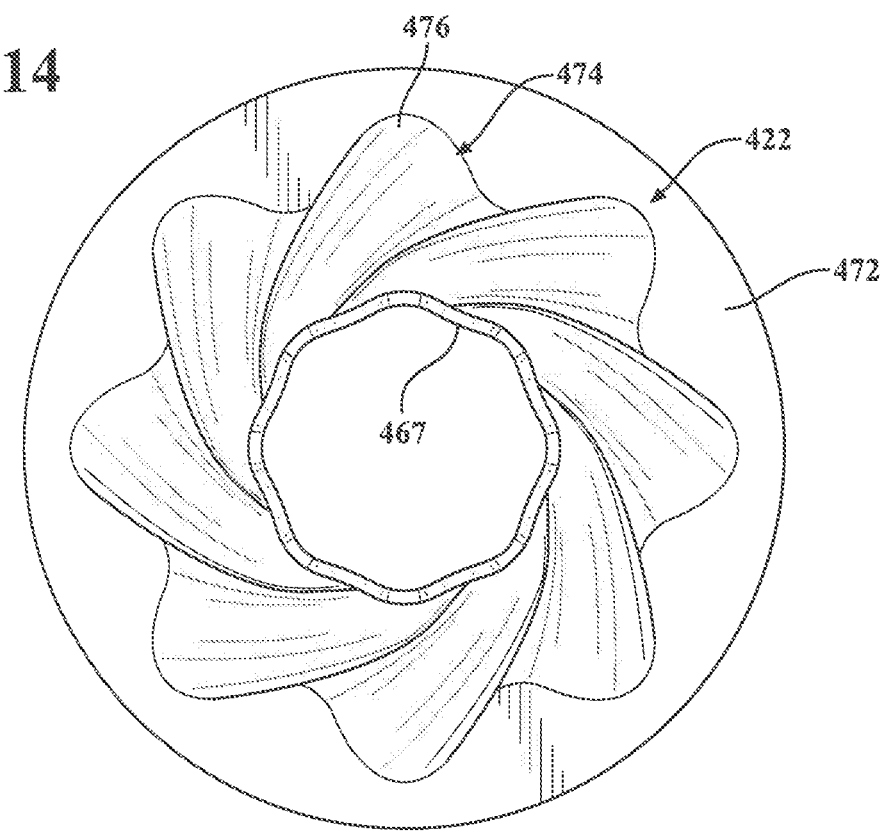
FIG. 14 is a cross-sectional view of the dust boot of FIG. 13 taken along line 13-13.
Figure 15:
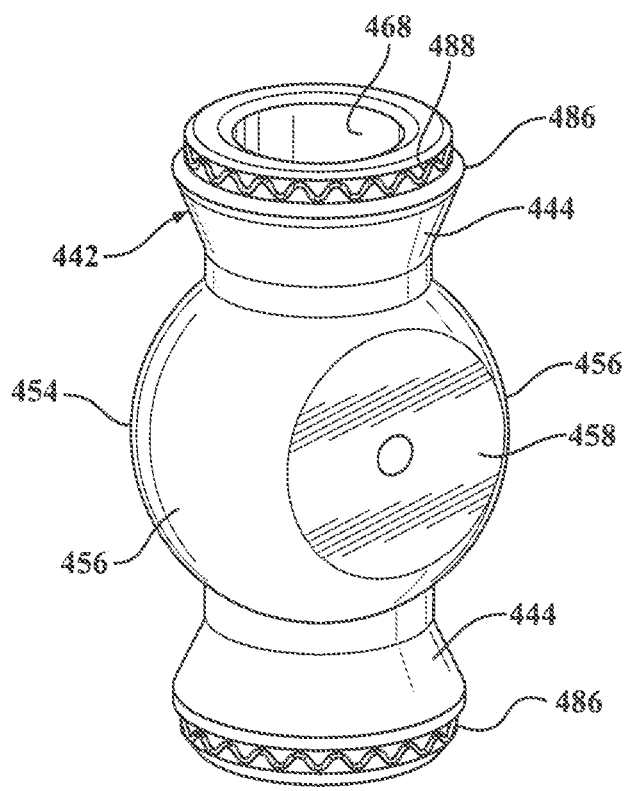
FIG. 15 is a perspective view of a stud of a vertical control arm bushing according configured for use with the fifth exemplary embodiment of the dust boot.

A fifth exemplary embodiment of a dust boot 422 and stud 442 configured for use with the dust boot 422 are shown in FIGS. 13-15, with like numerals, separated by a prefix of "4", being used to show features corresponding to the first exemplary embodiment discussed above. In the third exemplary embodiment, the waves 476 of the dust boot 422 extend into the stud opening 467 of the boot body 462 to define a waved inner surface 482 of the stud opening 467 (FIGS. 13 and 14). The end portions 444 of the stud 442 define a waved groove 486 extending circuitously about each end and the waved groove 486 defines an irregular surface 488 (FIG. 15) corresponding to the contour of the waved inner surface 482. The stud 442 also shows a pair of recessed surfaces 458 as discussed above with regard to the first exemplary embodiment. The waved inner surface 482 of the dust boot 422 engage the irregular surface 488 of the waved groove 486 of the end portions 444.

Figure 16:
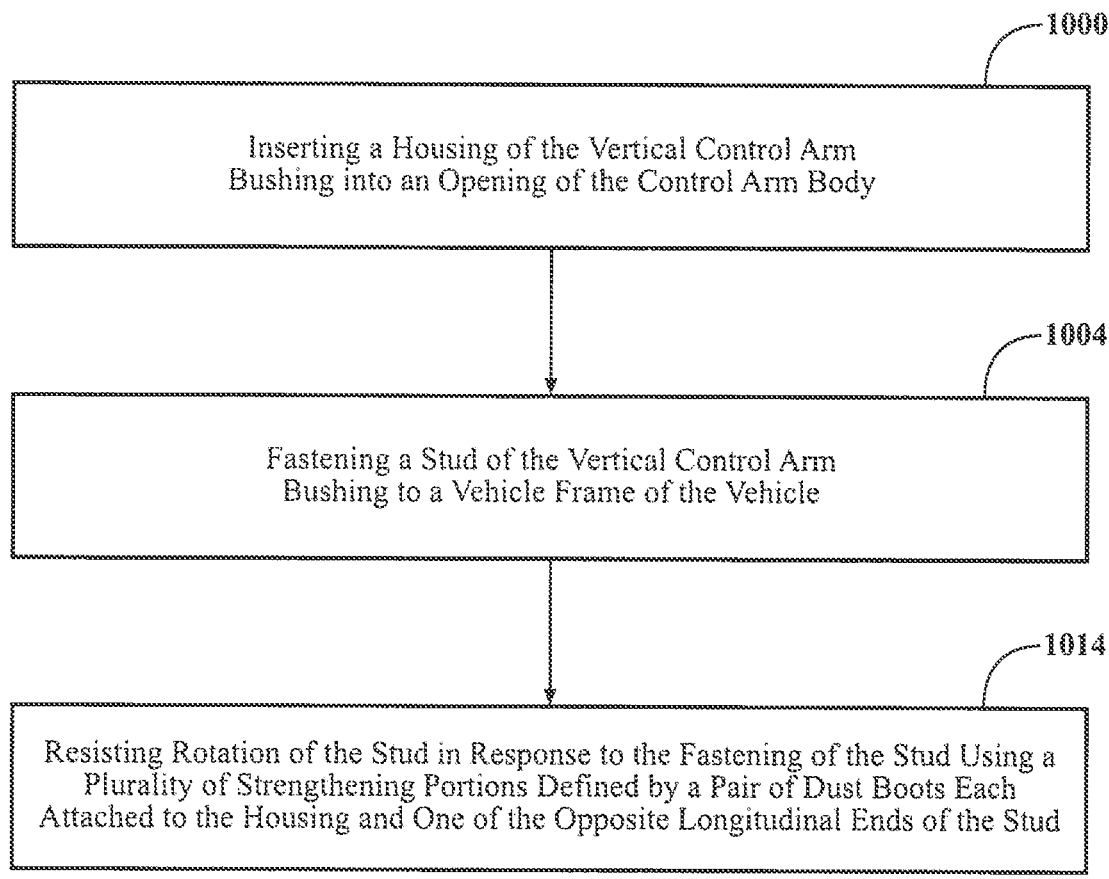

A flow chart of a method of installing a vertical control arm bushing 20 in a control arm body 14 of a vehicle is also provided in FIGS. 16 and 17. Although the method is described with regard to the first exemplary embodiment of the vertical control arm bushing 20, it should be understood that the method could be applied to any of the embodiments described herein. The method begins with the step 1000 of inserting a housing 24 of the vertical control arm bushing 20 into an opening of the control arm body 14. The method can also include the step 1002 of pressing the vertical control arm bushing 20 into the opening until a radially outwardly extending flange 30 disposed at one axial end of the housing 24 of the vertical control arm bushing 20 engages the control arm body 14.

The next step 1004 of the method is fastening a stud 42 of the vertical control arm bushing 20 to a vehicle frame 16. The step 1004 of fastening the stud 42 of the vertical control arm bushing 20 to the vehicle frame 16 can include 1006 moving the stud 42 of the vertical control arm bushing 20 having a pair of diametrically opposing end portions 44 extending through a central bore 26 of the housing 24 relative to the housing 24. Next, the method proceeds with the step 1008 of aligning a stud bore 68 extending through the stud 42 with at least one corresponding frame aperture in the vehicle frame 16. The step of fastening can additionally include 1010 inserting a fastener 52 through the at least one corresponding aperture of the vehicle frame 16 and the stud bore 68 of the stud 42 and 1012 tightening the fastener 52 to secure the vertical control arm bushing 20 and control arm body 14 to the vehicle frame 16.

The method continues by 1014 resisting rotation of the stud 42 in response to the fastening of the stud 42 using a plurality of longitudinal strengthening portions 74 (e.g., waves 76 or gussets 78) defined by a pair of dust boots 22 each attached to the housing 24 and one of the opposite longitudinal ends of the stud 42. As described above, the housing 24 extends along and is annularly disposed about an axis A and the plurality of strengthening portions 74, 80 can extend longitudinally at an acute angle α (e.g., 45 degrees) relative to the axis A in a relaxed condition of the dust boot 22.

Obviously, many modifications and variations of the present invention are possible in light of the above teachings and may be practiced otherwise than as specifically described while within the scope of the appended claims. Additionally, it is to be understood that all features of all claims and all embodiments can be combined with each other, as long as they do not contradict each other.

What is claimed is:

1. A vertical control arm bushing assembly for allowing rotation of a control arm relative to a vehicle frame, comprising:
    a vehicle frame having a pair of opposing mounting features extending therefrom and defining a pair of aligned apertures;
    a control arm disposed between said mounting features and having an opening therethrough aligned with the mounting feature apertures; and
    a vertical control arm bushing comprising:
    a housing extending along and annularly disposed about an axis and defining a central bore extending axially therethrough and an exterior surface fixedly received within the opening of the control arm;
    a stud having a pair of longitudinally opposing end portions extending along said axis through said central bore of said housing, each end portion affixed to a respective one of said mounting features, and a central ball portion pivotably and rotatably received within said housing, said stud including a stud bore which longitudinally extends through said stud;
    a fastener extending through said stud bore and said mounting feature apertures, and fixedly attaching each end portion of said stud with a respective one of said mounting features of the vehicle frame;
    a pair of dust boots, each dust boot including a boot body disposed annularly about said axis and defining an interior cavity and having a housing opening at a first longitudinal end attaching to said housing and a stud opening at a second longitudinal end opposite said first longitudinal end sealingly engaging one of said end portions of said stud;
    each of said boot bodies defining a plurality of longitudinal strengthening portions formed therein for resisting rotation or twisting of said dust boot and rotation of the stud relative to said housing, and for improving sealing of said dust boot with said end portion of said stud; and
    wherein for each of said boot bodies, said plurality of longitudinal strengthening portions extend longitudinally at an acute angle relative to said axis such that each longitudinal strengthening portion is circumferentially offset adjacent said first longitudinal end of said boot body as compared to said second longitudinal end of said boot body when said boot body is in a relaxed and non-twisted condition such that said plurality of strengthening portions resist rotation or twisting of said dust boots and rotation of said stud relative to said housing as said fastener is inserted through said stud bore and mounting feature apertures and tightened to secure said stud with said mounting features of said vehicle frame.

2. The vertical control arm bushing assembly as set forth in claim 1, further including a bearing disposed in said central bore of said housing and defining a concave inner surface surrounding a generally spherically-shaped cavity and wherein said ball portion of said stud engages said spherically-shaped cavity of said bearing to establish slidable contact between said ball portion of said stud and said concave inner surface of said bearing to allow pivoting and rotation of said stud relative to said bearing.

3. The vertical control arm bushing assembly as set forth in claim 2, further including a lubricant disposed in said spherically-shaped cavity of said bearing to provide a low friction interface between said ball portion of said stud and said concave inner surface of said bearing.

4. The vertical control arm bushing assembly as set forth in claim 1, wherein said acute angle is 45 degrees.

5. The vertical control arm bushing assembly as set forth in claim 1, further including an upper boot wall extending axially away from each said boot body at said second longitudinal end and disposed coaxially with said stud opening.

6. The vertical control arm bushing assembly as set forth in claim 1, further including a boot flange extending radially outwardly from each said boot body at said first longitudinal end and annularly about said housing opening.

7. The vertical control arm bushing assembly as set forth in claim 1, wherein said plurality of longitudinal strengthening portions include a plurality of waves.

8. The vertical control arm bushing assembly as set forth in claim 1, wherein said housing includes a radially outwardly extending flange disposed at one axial end of said housing for aiding in the installation of said vertical control arm bushing in the opening of the control arm.

9. A method of installing a vertical control arm bushing in a control arm body of a vehicle, comprising the steps of:
    providing a vehicle frame having a pair of opposing mounting features extending therefrom and defining a pair of aligned apertures;
    providing a control arm body disposed between said mounting features and having an opening therethrough aligned with the mounting feature apertures;
    providing a vertical control arm bushing comprising:
    a housing extending along and annularly disposed about an axis and defining a central bore extending axially therethrough and an exterior surface fixedly received within the opening of the control arm body;
    a stud having a pair of longitudinally opposing end portions extending along said axis through said central bore of said housing, each end portion affixed to a respective one of said mounting features, and a central ball portion pivotably and rotatably received within said housing, said stud including a stud passage which longitudinally extends through said stud; and
    a pair of dust boots, each dust boot including a boot body disposed annularly about said axis and defining an interior cavity and having a housing opening at a first longitudinal end attaching to said housing and a stud opening at a second longitudinal end opposite said first longitudinal end sealingly engaging one of said end portions of said stud;
    each of said boot bodies defining a plurality of longitudinal strengthening portions formed therein for resisting rotation or twisting of said dust boot and rotation of the stud relative to said housing, and for improving sealing of said dust boot with said end portion of said stud, and wherein each of said strengthening portions extends longitudinally at an acute angle relative to said axis such that each strengthening portion is circumferentially offset adjacent said first longitudinal end of said boot body as compared to said second longitudinal end of said boot body when said boot body is in a relaxed and non-twisted condition;

inserting a fastener through the aligned apertures in the mounting features of the vehicle frame and through the stud passage;

tightening the fastener to fixedly attach the stud with the vehicle frame; and resisting rotation or twisting of said dust boots and rotation of the stud relative to said housing during the steps of inserting and tightening the fastener via the plurality of strengthening portions defined on each of the dust boots.

10. The method as set forth in claim 9, further including the step of pressing the vertical control arm bushing into the opening until a radially outwardly extending flange disposed at one axial end of the housing of the vertical control arm bushing engages the control arm body.

11. The method as set forth in claim 9, wherein the plurality of longitudinal strengthening portions include a plurality of waves.

12. The method as set forth in claim 9, wherein the acute angle is 45 degrees.

* * * * *